Aug. 7, 1934.   L. U. LARKIN   1,969,652
AUTOMATICALLY CONTROLLED REFRIGERATING SYSTEM
Filed Oct. 17, 1931   5 Sheets-Sheet 1
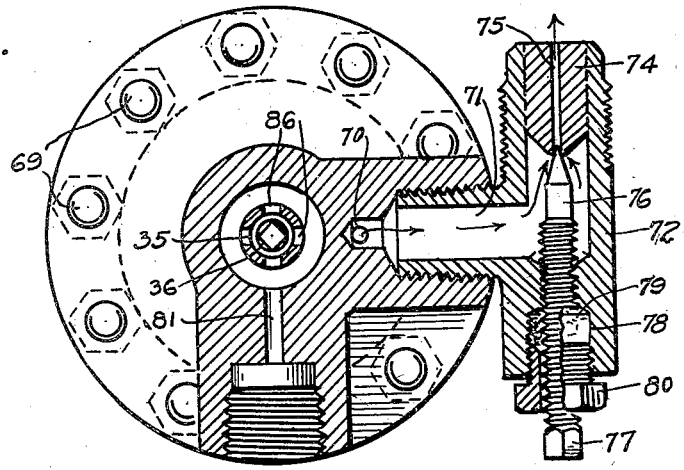
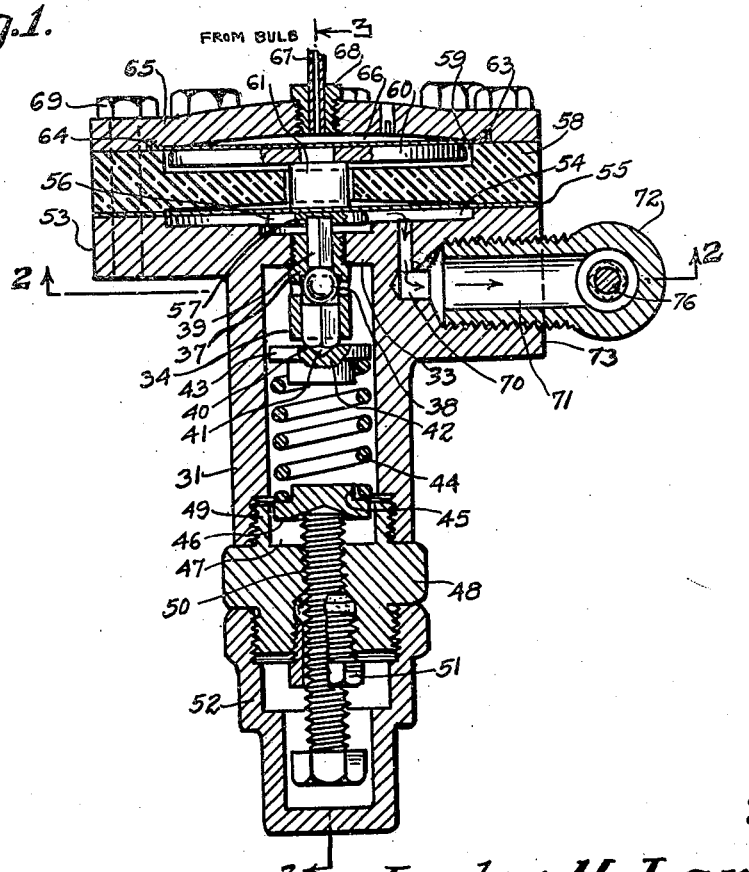
Inventor
Lester U. Larkin
By Mason Fenwick&Lawrence
Attorneys

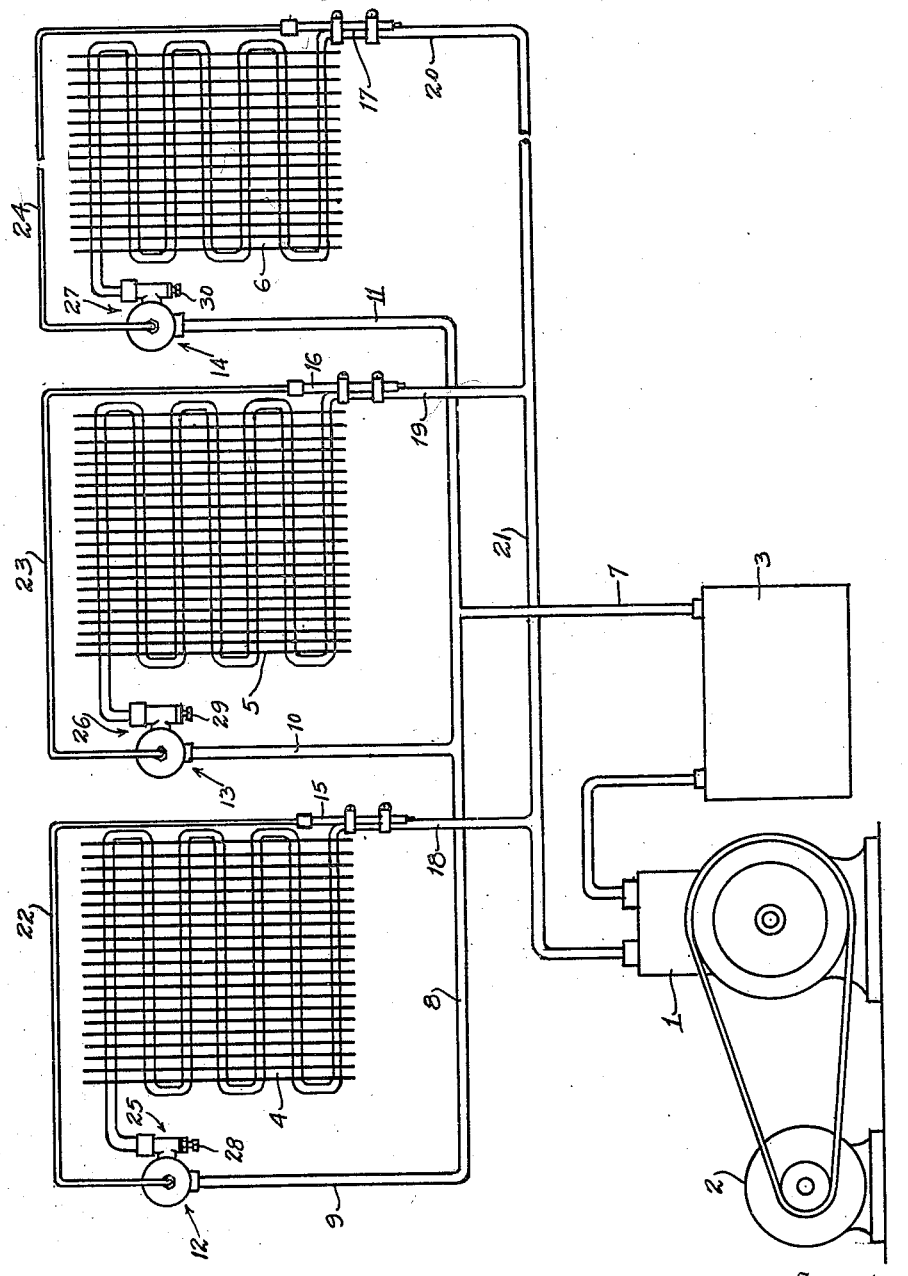

Aug. 7, 1934.  L. U. LARKIN  1,969,652
AUTOMATICALLY CONTROLLED REFRIGERATING SYSTEM
Filed Oct. 17, 1931  5 Sheets-Sheet 3
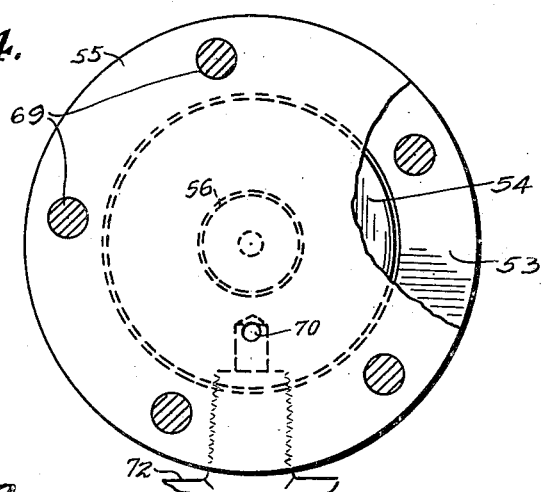
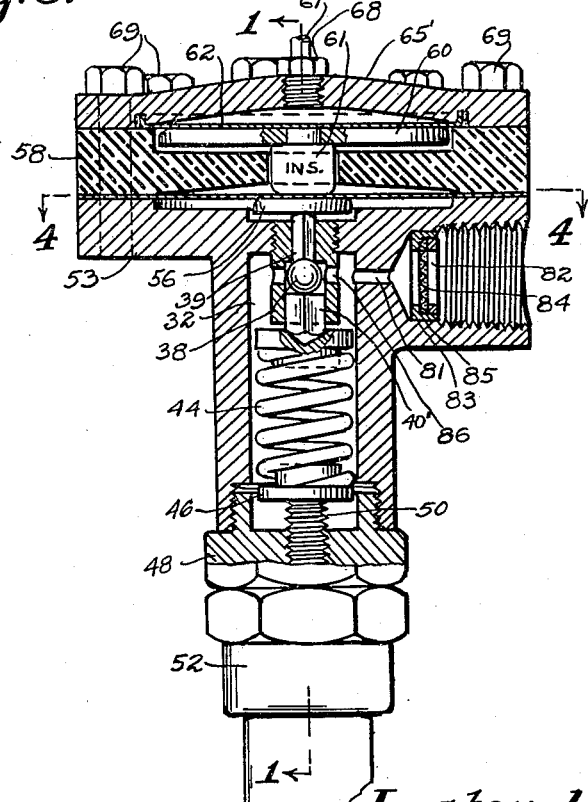
Inventor
Lester U. Larkin
By Mason Fenwick & Lawrence
Attorneys Aug. 7, 1934.   L. U. LARKIN   1,969,652
AUTOMATICALLY CONTROLLED REFRIGERATING SYSTEM
Filed Oct. 17, 1931   5 Sheets-Sheet 4

Inventor
Lester U. Larkin
By Mason Fenwick & Lawrence
Attorneys

Aug. 7, 1934.   L. U. LARKIN   1,969,652
AUTOMATICALLY CONTROLLED REFRIGERATING SYSTEM
Filed Oct. 17, 1931   5 Sheets-Sheet 5
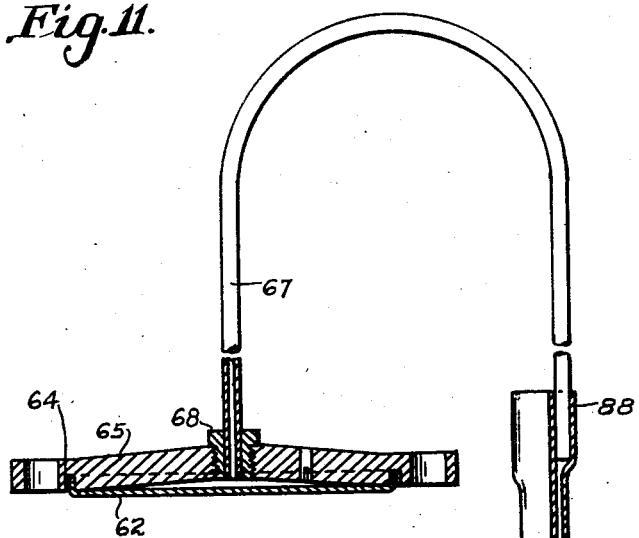
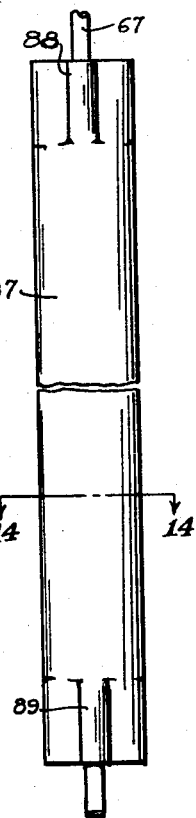
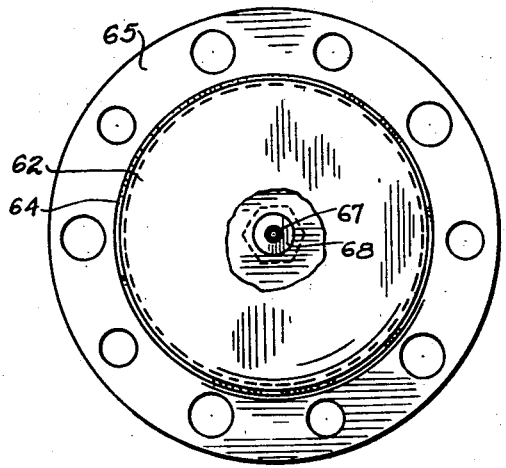
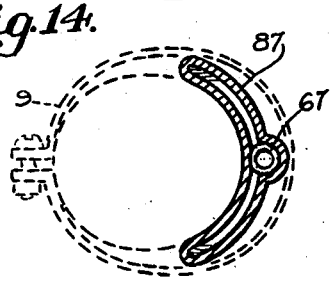
Inventor
Lester U. Larkin
By Mason Fenwick Lawrence
Attorneys Patented Aug. 7, 1934

1,969,652

UNITED STATES PATENT OFFICE 1,969,652

AUTOMATICALLY CONTROLLED REFRIGERATING SYSTEM

Lester U. Larkin, Atlanta, Ga., assignor to Larkin Refrigerating Corporation, Atlanta, Ga.

Application October 17, 1931, Serial No. 569,505

3 Claims. (Cl. 62—127)

The invention forming the subject matter of this application relates to thermostatic controls for automatic refrigerating systems, and is particularly adapted for use in systems provided with one or more cross fin cooling units of the type disclosed in the U. S. patent to Larkin, #1,776,235, September 16, 1930, although not by any means restricted to use with such units.

The main object of the present invention is to provide a separate control valve to control the supply of refrigerant to each of a series of cooling units in accordance with the temperature in the suction or return line leading from each unit to the compressor of the apparatus.

Another object of the invention is to provide each cooling unit in a system of this type with a control valve having a thermostatic element so constructed and positioned as to be instantly responsive to a given change in temperature of the unit to which it is connected; and, in which the thermostatic element can be quickly attached to the control valve and cooling unit, and as quickly removed for replacement or repair without in any way affecting the other parts of the control valve or system.

A further object of the invention is to provide a system of this character with a control valve to which the refrigerant is fed in liquid form, and from which it is ejected, still in liquid form but finely divided; and caused to expand outside the control valve and in the cooling units alone.

Still another object of the invention is to provide a thermostatically operated control valve in systems of this character and in which the thermostatic element is insulated from the liquid receiving parts of the control valve so that its operation shall not be affected by the temperature of the liquid in the control valve.

Other objects of the invention will become apparent as the detailed description thereof proceeds.

In the drawings:

Figure 1a is a diagrammatic layout of a system using a plurality of cooling units each of which is provided with a separate control valve;

Figure 1 is a central vertical section through the control valve above referred to, and taken on line 1—1 of Figure 3;

Figure 2 is a horizontal transverse section taken on the line 2—2 of Figure 1;

Figure 3 is a central vertical section taken on the line 3—3 of Figure 1;

Figure 4 is a horizontal section taken on the line 4—4 of Figure 3, part of the valve being broken away to show details of construction;

Figure 7 is an exploded perspective of a detachable head for the control valve and forming part of the detachable thermostatic element previously referred to;

Figure 11 is a central vertical section through the thermostatic element detached from the control valve;

Figure 12 is a side elevation of a container forming part of the thermostatic element shown in Figure 11;

Figure 13 is a top plan view of the detachable cover for the control valve, which also forms a part of the thermostatic element; and Figure 14 is a horizontal section to an enlarged scale taken on the line 14—14 of Figure 12.

Figure 5:
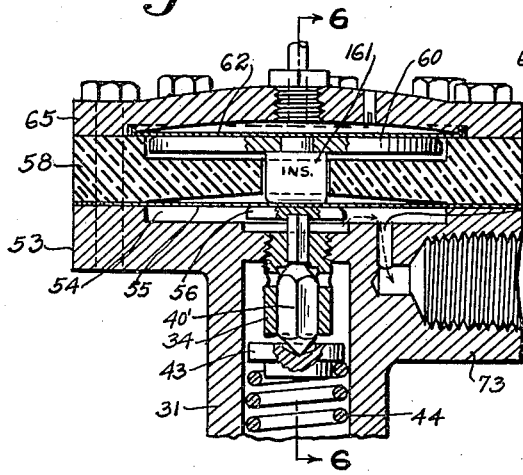
Figure 5 is a fragmentary vertical section similar to Figure 3 but illustrating the modification of a valve used therein.

As shown diagrammatically in Figure 1a, the invention comprises a compressor 1 operated by a motor 2 and a condenser 3, such as are in common use in mechanical refrigeration apparatus. This apparatus may be controlled by any of the well known pressure control valves which form no part of the present invention and are therefore not illustrated herein. The system is shown as comprising three cooling units 4, 5 and 6, preferably of the type in which the refrigerant is forced through a series of parallel branches of pipes having heat absorbing fins arranged perpendicularly across all of said branches.

The feed line 7 from the compressor 3 conducts refrigerant in liquid form to a manifold 8 having branches 9, 10 and 11 conducting liquid refrigerant into the control valves 12, 13 and 14, respectively. The entrance of liquid into each of these control valves is regulated by means of thermostats 15, 16 and 17 securely clamped to the return lines 18, 19 and 20, respectively, which are in turn connected to the compressor manifold 21 for returning the saturated gaseous refrigerant to the compressor. The thermostats 15, 16 and 17 are connected by pipes 22, 23 and 24 to their respective valves 12, 13 and 14 and operate these valves in accordance with the temperature of the return lines 18, 19 and 20 to control the admission of liquid refrigerant into their respective control valves.

The feed of liquid refrigerant from the respective control valves to the cooling units is effected through spray nozzles 25, 26 and 27 so that the liquid emerges from these nozzles as a fine spray which is expanded and becomes gaseous in the cooling units 4, 5 and 6. The pressure at which the liquid is released from each of the control valves 12, 13 and 14 is regulated by the adjustment of needle valves 28, 29 and 30 in the respective spray nozzles 25, 26 and 27.

It will be observed from this diagram that the operation of the control valves is effected automatically by changes in the temperature of the cooling coils at the points where the refrigerant emerges from the cooling units to be returned to the compressing and condensing apparatus. Since each unit is controlled by a separate valve, the supply of refrigerant to the units becomes uniform throughout. In other words, the flow of refrigerant to each cooling unit is directly and positively controlled independently of the flow of refrigerant to any other unit. This means that each cooling unit may be maintained at the proper temperature independently of the other units so long as the pressure of refrigerant from the main refrigerating apparatus is maintained.

While I have illustrated the control valve as applied to a multiple system of cooling units, it must be understood that it is not to be limited to a system having any particular number of units, as it may be just as readily applied to a system having a single unit or of any desired number, which, of course, will be limited by the capacity of the refrigerating plant to supply.

Coming now to the details of control valves and referring particularly to Figures 1, 2, 3 and 4 of the drawing, each control valve is shown as comprising a casing 31 provided with a substantially vertical central bore 32 which terminates its upper end in an inturned annular flange 33 screwthreaded to receive the external screwthreads of a valve cage 34. The cage 34 extends downwardly into the bore 32 to form a chamber for refrigerant liquid. Cage 34 is provided with an enlarged central bore 35 coaxial with a smaller bore 36. At the junction of the bores 35 and 36, the cage 34 is shaped to provide a valve seat 37 for a ball valve 38. The ball valve 38 is located between a sliding plunger 39 in the small bore 36 and a plunger 40 located in the large bore 35, both plungers being square in cross section. The lower end of the plunger 40 is tapered, and this tapered end 41 is positioned in a correspondingly tapered seat 42 formed in a bearing button 43 carried by the upper end of a compression spring 44 seated in the chamber 32 of the casing 31.

The lower end of the compression spring 44 is seated in the annular rabbet 45 of a button 46 slidably mounted in a cylindrical recess 47 formed in a bushing 48 which is screwthreaded by means of threaded flange 49 into the lower end of the casing 31. The button 46 may be adjusted against the compression of the spring 44 by means of a screw 50 adjustably mounted in the bushing 48. The screw 50 may be locked in adjusted position by means of the lock nut 51 which is in internal screwthreaded connection with the screw 50 and is externally screwthreaded to seat in a correspondingly screwthreaded bore formed in the bushing 48. The lower part of the bushing 48 is reduced in diameter and is externally screwthreaded to receive the screw threads of a protecting thimble 52 adapted to cover and protect the adjusting screw 50.

The upper part of the casing 31 is expanded to form an annular flange 53; and this flange 53 is centrally dished out to form a recess 54 over which is positioned a flexible diaphragm 55 forming part of the control mechanism for this valve. The diaphragm 55 bears directly upon a disk 56 provided at its center with a recess 57 in which the valve plunger 39 is seated. The diaphragm 55 is located below a disk 58 of insulating material; and this disk 58 is centrally dished out to provide a cylindrical recess 59 in which moves a large metallic disk 60. This disk 60 has a button 61 of insulating material secured to the center thereof and the lower end of this button 61 rests upon the diaphragm 55.

A flexible diaphragm 62, having an upturned edge or rim 63, is seated directly over and in contact with the disk 60. The cylindrical edge or rim 63 fits into an annular recess 64 formed in the lower face of a cap 65 which is dished out at its center to form a recess 66. This recess 66 permits the movement of the central part of the diaphragm 62 toward and from the end of a pressure pipe 67, corresponding to pipes 22, 23 and 24 in diagram Figure 1a, secured at the center of the cap 65 by means of a bushing 68.

The cap plate 65 and the insulated disk 58 are provided with apertures which register with each other and with apertures formed in the flange 53 of the casing 31. The apertures in the said flange 53 are screwthreaded to receive the correspondingly threaded ends of bolts 69 for clamping the cap 65, disk 58, and all the other elements of the assembly in the position shown in Figure 1 of the drawings.

The recess 54 is connected by an L-shaped passageway 70 to the bore 71 of a T-fitting 72, the central arm of which is screwthreaded into an enlargement 73 formed at the side of the casing 31 concentric with the lower part of the passageway 70. The head of the T-fitting 72 is provided at one end with a nozzle 74 having a fine bore 75 formed centrally therein. The bore of this nozzle is controlled at its inner end by a needle valve 76 screwthreaded into part of the head 72. The needle valve 76 terminates outside of the head 72 in a polygonal head 77 adapted to receive a wrench for the purpose of adjusting the needle valve toward and from the end of the bore 75 in the nozzle 74. The rear end of the head 72 is bored to form a chamber 78 adapted to receive packing 79 which surrounds the screwthreaded part of the needle valve 76. The bore 78 is internally screwthreaded at its outer end to receive a lock nut 80 which serves not only to lock needle valve 76 in adjusted position but also serves to hold the packing 79 in the bore 78. This needle valve construction regulates the flow of liquid refrigerant from the chamber 32 of the casing 31 out to each of the separate cooling units illustrated in Figure 1a.

The adjusting head 77 of Figure 2 is indicated by the numerals 28, 29 and 30 in the system shown in Figure 1a, the latter numerals being used mainly to indicate the separate adjusting heads in the separate valves 12, 13 and 14 which control the supply of liquid refrigerant to the cooling units. The liquid refrigerant is conducted by any of the pipes 9, 10 or 11 to a passageway 81 (see Figures 2 and 3), which is formed coaxially with the large bore 82 internally screwthreaded to receive a fitting for suitably connecting any of the lead-in pipes 9, 10 or 11 to the particular valve in use. The bore 82, as shown in Figure 3, is slightly reduced to receive a rabbeted ring 83, in the rabbet of which is seated a small screen 84, secured in place in that rabbeted ring by a second ring 85. This screen, of course, is used to strain the liquid refrigerant as it is fed to the passageway 81 and thence into the chamber 32 of the casing 31.

It will be seen from Figures 1 and 3 of the drawing that the valve cage 34 is provided with radial apertures 86 through which liquid refrigerant may flow against the ball valve 38 as it fills the chamber 32. In the position shown in Figures 1 and 3, the ball valve 38 confines this liquid to the chamber 32. It will be apparent, however, that if the ball valve 38 be removed from its seat against the pressure of the spring 44, the liquid under pressure may flow around the square plunger 39 and into the recess 54 whence it may flow through the passageway 70 into the chamber 71 which forms part of the T-shaped fitting 72 in which the spray nozzle 74 and needle valve 76 are mounted.

As shown in Figures 11 to 14 of the drawings, the cap 65 is connected to one end of the tube 67; and the other end of the tube is connected to a container 87. The container 87 is semi-circular in cross section seal and is provided at its top and bottom ends with enlargements 88 and 89, the enlargement 88 being adapted to receive one end of the tube 67 and the enlargement 89 being adapted to receive a small tube, the lower end of which is closed by a plug 90. The upper and lower ends of the tube are, of course, hermetically sealed to hold the gas therein without leakage. This semi-circular container 87 is designed to receive a given volume of gas adapted by its expansion and contraction to operate the flexible diaphragm 62 and thereby move, through the intervening elements, the ball valve 38 from its seat in order to permit the admission of liquid refrigerant into the chamber 32 in accordance with the temperature requirements of the cooling unit to which the control valve is directly connected.

The container 87 is made of suitable length and shape to adapt it to be readily clamped to the suction line of the cooling unit to which the control valve happens to be connected. This shape of the container adapts it to be seated very readily on a pipe and gives a very large area of contact with the suction line referred to and provides a very sensitive element for responding to changes of temperature in that suction line and for operating the diaphragm 62 above referred to.

The diaphragm 62 is soldered into the annular recess formed in the cap 63 so that the said cap and diaphragm and the tube 67 and the container 87 form a thermostatic unit which can be readily removed from the control valve and from the cooling unit without in any way effecting the function of the remaining parts and without requiring drainage of any of the elements as a necessary preliminary for the removal of this thermostatic control.

Figure 6:
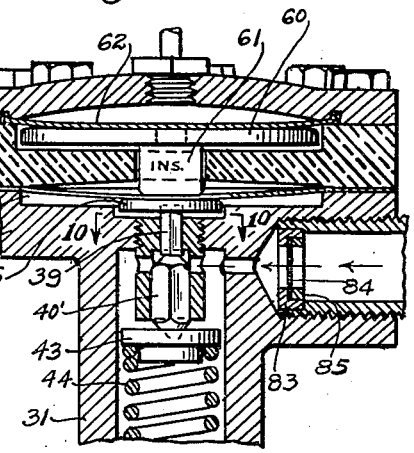
Figure 6 is a vertical section taken on the line 6—6 of Figure 5.
Figure 7:
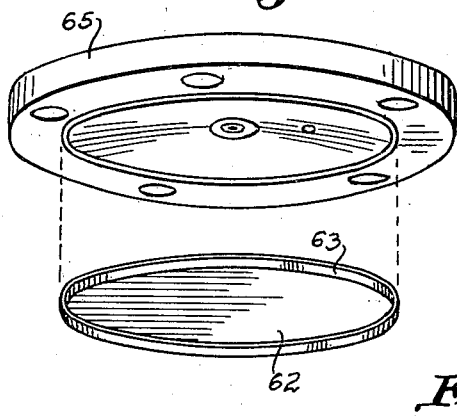
Figure 9:
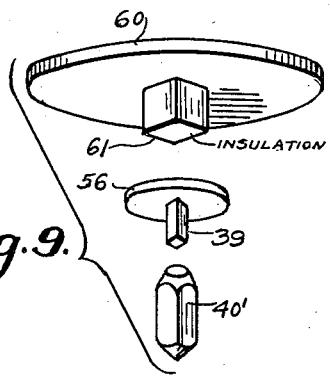
Figure 9 is an exploded perspective of the valve elements which control the admission of liquid refrigerant into the control valve.
Figure 8:
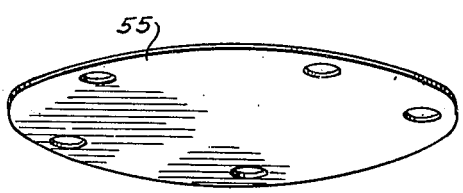
Figure 8 is a perspective of one of the flexible diaphragms forming part of the control valve.
Figure 10:
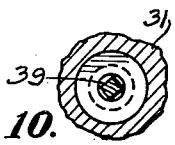
Figure 10 is a horizontal section taken on the line 10—10 of Figure 6.

The modification shown in Figures 5 and 6 differs from that already described only by omission of the ball valve 81. In this modified form, the upper end of a plunger 40' is tapered to take the place of the ball valve 38 in co-operation with the valve seat 37 formed at the junction of the bores 35 and 36 of the valve cage 34. There is no substantial change in the form of the other elements of this modification, and the operation of which will be obvious from inspection of the drawings.

In operation, the control valve is adjusted so as to admit liquid refrigerant to the chamber therein from the condenser when the temperature at the outlet or suction side of each cooling unit exceeds a predetermined temperature selected as a minimum for the unit. The maintenance of the refrigerant in liquid form in the control valve prevents the sticking of the several parts of the same. The heat insulating plate interposed between the valve mechanism itself and the thermostatic control insures automatic operation of the valve in accordance with the temperature at the outlet side of each unit and independent of variations of temperature such as ordinarily occur in expansion valves of the old type, and in which the liquid is expanded or gasified in the valve casing itself, instead of, as in the present case, expanded outside the casing and entirely within the cooling unit.

The well known efficiency of the cross fin type of cooling unit and the slight differential between the inlet and outlet sides thereof required for proper cooling presents decided advantageous features in connection with the valve disclosed herein. In ordinary use, the valve, adjusted by means of the screw 50, admits liquid only when the temperature at the outlet side of each unit and in contact with the tube of the thermostat exceeds a predetermined minimum temperature, preferably one or two degrees above freezing. By this adjustment, each cooling unit is maintained at proper cooling temperature and at the same time is kept from frosting, so that there is never any necessity for defrosting the units in a system of this character.

In the system disclosed in Figure 1a, it will be apparent that each control valve and its thermostat operates independently of every other control valve and of every other unit in the system, so that each unit may be completely disconnected from the system without disturbing any of the other units, or the control valves connected thereto. The necessity for insulating the lead-in pipes from a common expansion valve to the separate units is obviated.

It is clear, too, that injury to the thermostatic element can be readily corrected simply by removal of the thermostatic unit as a whole and without disturbing any of the other elements of the valve. It will be obvious, too, that while the thermostatic element is removed, the thermostatic pressure for operating the ball valve in the control valve chamber is also removed, so that the control valve becomes automatically closed by pressure of the spring in the casing, and remains closed while the thermostatic element is removed therefrom, thereby avoiding flooding or drainage of any particular unit upon the thermostatic unit.

It will be apparent from the construction of the control valve mechanism and the thermostat connected thereto that when the system is first started in operation to supply cooling material to each of the units, the ball valve within the control valve chamber will be opened fully by the pressure of the expanded gas in the thermostatic element on the flexible diaphragm. The liquid refrigerant is first admitted at full pressure into the control valve chamber leading to the needle valve connected to the spray nozzle for atomizing the refrigerant as it passes to each unit.

In each unit, the atomized liquid refrigerant is suddenly expanded, and changed to refrigerant gas, thereby quickly cooling the unit. The consequent reduction in temperature of the unit at once reacts upon the thermostatic element through the tube connected to the outlet side of the unit, and thereby decreases the pressure on the flexible diaphragm of the control valve to reduce the valve opening for liquid refrigerant to the control valve, and, incidentally, reduces the pressure therein. This results in a decided saving in power consumed in providing the necessary quantity of liquid refrigerant in a given time. The speedy reduction of temperature by the cross fin coils obviously reduces the time of operation of the control valve, and closes the control valve entirely when the temperature at the outlet side of the valve falls to its selected predetermined minimum.

When the system is shut down for any reason and the temperature of the cooling unit rises, the thermostatic elements automatically open the control valves so that these valves are properly positioned to admit liquid refrigerant as soon as the system is again started in operation.

It will be apparent that through the provision of this very simple control valve, the operation of the refrigeration system is performed entirely automatically and substantially increases the efficiency of the system as a whole. It operates in such manner as to eliminate all chance of injury to the compressor or to the movable elements of the control element themselves. The automatic control results in a decided saving of time and labor, while loss due to the production of temperatures too high or too low through the carelessness of an attendant is eliminated. The thermostatic control may be adjusted so the valve opens at all temperatures above a selected minimum and closes as soon as that minimum is reached. Preferably this minimum is selected at one or two degrees above freezing so that the cooling units never become frosted, while the efficiency of the unit is not in anyway impaired.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. A refrigerant control valve, comprising a casing having two chambers adapted to contain liquid refrigerant, a valve controlling the inlet of liquid to one of said chambers from the other, a fitting detachably connected to said casing to form an outlet from the first named chamber, and an atomizing valve adjustable in said fitting to control the discharge of liquid from the second chamber.

2. A refrigerant control valve comprising a casing, valve mechanism in said casing to control the passage of refrigerant liquid therethrough, a flexible diaphragm forming one wall of said casing and operatively in contact with said mechanism, an apertured plate of heat insulating material clamping the outer edge of said diaphragm to said casing, a temperature controlled diaphragm seated on said plate, a plunger slidable through the aperture in said plate and in contact with each of said diaphragms, and means for clamping said plate and diaphragms in assembled position on said casing.

3. A control valve for refrigerating systems comprising a casing divided into two chambers, a diaphragm forming a wall of one of the said chambers, a cage connecting the two chambers to each other and provided with a valve seat, a valve slidable in said cage toward and from said seat, yielding means for normally forcing said valve against said seat, means for adjusting the tension of said yielding means, a thermostatic element comprising a dished out cap, a second diaphragm secured to said cap over the dished out portion thereof, heat insulating means separating the two diaphragms from each other, a heat insulating plunger in contact with both of said diaphragms, a tube connected to the dished out portion of said cap and containing a fluid responsive to temperature changes, and means for clamping the cap and insulating material and diaphragms to said casing.

LESTER U. LARKIN.